United States Patent
Abdollahian

(10) Patent No.: US 9,430,704 B2
(45) Date of Patent: Aug. 30, 2016

(54) IMAGE PROCESSING SYSTEM WITH LAYOUT ANALYSIS AND METHOD OF OPERATION THEREOF

(71) Applicant: Sony Corporation, Tokyo (JP)

(72) Inventor: Golnaz Abdollahian, San Jose, CA (US)

(73) Assignee: Sony Corporation, Tokyo (JP)

( * ) Notice: Subject to any disclaimer, the term of this patent is extended or adjusted under 35 U.S.C. 154(b) by 16 days.

(21) Appl. No.: 14/599,417

(22) Filed: Jan. 16, 2015

(65) Prior Publication Data

US 2016/0210507 A1    Jul. 21, 2016

(51) Int. Cl.
| | |
|---|---|
| G06K 9/46 | (2006.01) |
| G06T 11/60 | (2006.01) |
| G06K 9/00 | (2006.01) |
| G06K 9/18 | (2006.01) |
| G06K 9/52 | (2006.01) |
| G06T 3/60 | (2006.01) |

(52) U.S. Cl.
CPC .......... *G06K 9/00463* (2013.01); *G06K 9/18* (2013.01); *G06K 9/4604* (2013.01); *G06K 9/52* (2013.01); *G06T 3/60* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 5,268,967 A | 12/1993 | Jang et al. | |
| 5,321,770 A | 6/1994 | Huttenlocher et al. | |
| 5,809,167 A | 9/1998 | Al-Hussein | |
| 5,892,843 A | 4/1999 | Zhou et al. | |
| 6,470,094 B1 | 10/2002 | Lienhart et al. | |
| 7,327,882 B2 | 2/2008 | Wang et al. | |
| 8,208,698 B2 | 6/2012 | Bogdan | |
| 8,224,092 B2 | 7/2012 | Bressan | |
| 8,311,329 B2 | 11/2012 | Meyer et al. | |
| 8,335,402 B1 | 12/2012 | Manmatha et al. | |
| 8,509,534 B2 | 8/2013 | Galic et al. | |
| 8,649,600 B2 | 2/2014 | Saund | |
| 8,917,935 B2 | 12/2014 | Epshtein et al. | |
| 2005/0180647 A1* | 8/2005 | Curry ................ | G06K 9/00456 382/243 |
| 2015/0169972 A1* | 6/2015 | Vu ........................ | G06K 9/342 382/182 |

OTHER PUBLICATIONS

Saragiotis et al, "Local Skew Correction in Documents", 2008, International Journal of Pattern Recognition and Artificial Intelligence, vol. 22, No. 4, pp. 691-710.*

(Continued)

*Primary Examiner* — David F Dunphy
(74) *Attorney, Agent, or Firm* — Haverstock & Owens LLP

(57) ABSTRACT

An image processing system and method of operation includes: a source image; a binary mask image generated from the source image; a connected components module for detecting character targets; a text unit module, coupled to the connected components module, for forming connected neighbors by grouping the character targets having bounding boxes with a horizontal overlap greater than a horizontal overlap threshold, and for forming a text unit by grouping the character targets having a character vertical overlap greater than a character vertical overlap threshold, each of the character targets having a character feature within a feature threshold; a identify baseline module, coupled to the text unit module, for calculating a text unit baseline angle for rotating the text unit to the horizontal; and an optical character recognition module, coupled to the text unit module, for detecting an output text of the text unit for display on a device.

17 Claims, 9 Drawing Sheets

(56) References Cited

OTHER PUBLICATIONS

Wikipedia, Mask (computing) [online], [retrieved on Jun. 1, 2016]. Retrieved from the Internet <URL: https://en.wikipedia.org/wiki/Mask_(computing) >, pp. 1-6.*

Gatos et al, 'Adaptive degraded document image binarization', 2006, Pattern Recognition 39 (2006), pp. 317-327.*

U.S. Appl. No. 14/599,423, filed Jan. 16, 2015, Abdollahian et al.

U.S. Appl. No. 14/599,431, filed Jan. 16, 2015, Abdollahian et al.

Dawood et al., Improved Arabic Word Classification using Spatial Pyramid Matching Method, p. 6 pgs, Image Processing and Pattern Recognition Laboratory, Beijing Normal University, Beijing, China; Retrieved on Dec. 4, 2013.

Epshtein et al., Detecting Text in Natural Scenes with Stroke Width Transform, pp. 1-8, Microsoft Corporation; Retrieved on Dec. 4, 2013.

Gatos et al., Restoration of Arbitrarily Warped Document Images Based on Text Line and Word Detection, Pattern Recognition, and Applications, Feb. 14, 2007, pp. 203-208, Proceedings of the Fourth IASTED International Conference Signal Processing, Innsbruck, Austria.

Gllavata et al., A Robust Algorithm for Text Detection in Images, p. 6pgs, University of Siegen, Siegen, Germany, Dept. of Math. & Computer Science; Retrieved on Dec. 5, 2013.

Neumann, Scene text recognition in images and video, PhD Thesis Proposal, Aug. 31, 2012, p. 56 pgs, Department of Cybernetics, Center for Machine Perception, Czech Technical University in Prague, Czech.

Rothacker, Learning Bag-of-Features Representations for Handwriting Recognition, Diploma thesis, Nov. 2011, p. 90 pgs, Department of computer science Technische Universitt Dortmund, Germany.

Song et al., A Novel Image Text Extraction Method Based on K-means Clustering, Seventh IEEE/ACIS International Conference on Computer and Information Science, 2008, pp. 185-190, IEEE, Beijing, China.

Yang et al., Evaluating Bag-of-Visual-Words Representations in Scene Classification, Woodstock '97 El Paso, Texas, , p. 9 pgs, US.

* cited by examiner

IMAGE PROCESSING SYSTEM WITH LAYOUT ANALYSIS AND METHOD OF OPERATION THEREOF

CROSS-REFERENCE TO RELATED APPLICATION(S)

The present application contains subject matter related to a concurrently filed U.S. patent application by Golnaz Abdollahian, Alexander Berestov, Hiromasa Naganuma, and Hiroshige Okamoto entitled "TEXT RECOGNITION SYSTEM WITH FEATURE RECOGNITION AND METHOD OF OPERATION THEREOF". The related application is assigned to Sony Corporation and is identified by Ser. No. 14/599,423. The subject matter thereof is incorporated herein by reference thereto.

The present application contains subject matter related to a concurrently filed U.S. patent application by Golnaz Abdollahian, Alexander Berestov, Hiromasa Naganuma, and Hiroshige Okamoto entitled "IMAGE PROCESSING SYSTEM FOR CLUTTERED SCENES AND METHOD OF OPERATION THEREOF". The related application is assigned to Sony Corporation and is identified by Ser. No. 14/599,431. The subject matter thereof is incorporated herein by reference thereto.

TECHNICAL FIELD

The present invention relates generally to image processing systems, and more particularly to an image processing system with layout analysis.

BACKGROUND ART

The deployment of high quality imaging to smart phones, digital cameras, personal digital assistants (PDA), and other information devices with screens has grown tremendously in recent years. The wide variety of information devices supporting image processing and text recognition requires the ability to process multiple types of images with varying degrees of available text information.

Imaging devices with optical character recognition (OCR) can employ a variety of techniques for recognizing text under different conditions. Some OCR systems can extract textual information from structured documents where the location of text in the image can be predicted. Other OCR systems can extract text from images having simple, uncluttered backgrounds where the text can be readily identified. Such systems are processing information in images of varying quality, resolution, and orientation, but rely on additional text cues such as regular spacing, orientation, and fonts to assist in text detection.

Thus, a need still remains for an image processing system that can deliver good picture quality and features across a wide range of device with different sizes, resolutions, and image quality. In view of the increasing demand for providing optical character recognition on the growing spectrum of intelligent imaging devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have long been sought but prior developments have not taught or suggested any solutions and, thus, solutions to these problems have long eluded those skilled in the art.

DISCLOSURE OF THE INVENTION

The present invention provides a method of operation of an image processing system including: generating a binary mask image of a source image; detecting character targets within the binary mask image, the character targets covering contiguous portions of the binary mask image; forming connected neighbors by grouping one of the character targets and another of the character targets having bounding boxes with a horizontal overlap greater than a horizontal overlap threshold; forming a text unit by grouping the character targets of the connected neighbors, the character targets having a character vertical overlap greater than a character vertical overlap threshold, one of the character targets having a character feature within a feature threshold of another of the character targets, and the text unit a portion of the source image; calculating a text unit baseline angle for rotating the text unit to the horizontal; and detecting an output text of the text unit for display on a device.

The present invention provides an image processing system including: a source image; a binary mask image generated from the source image; a connected components module for detecting character targets within the binary mask image, the character targets covering contiguous portions of the binary mask image; a text unit module, coupled to the connected components module, for forming connected neighbors by grouping one of the character targets and another of the character targets having bounding boxes with a horizontal overlap greater than a horizontal overlap threshold, and for forming a text unit by grouping the character targets of the connected neighbors, the character targets having a character vertical overlap greater than a character vertical overlap threshold, one of the character targets having a character feature within a feature threshold of another of the character targets, and the text unit a portion of the source image; a identify baseline module, coupled to the text unit module, for calculating a text unit baseline angle for rotating the text unit to the horizontal; and an optical character recognition module, coupled to the text unit module, for detecting an output text of the text unit for display on a device.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
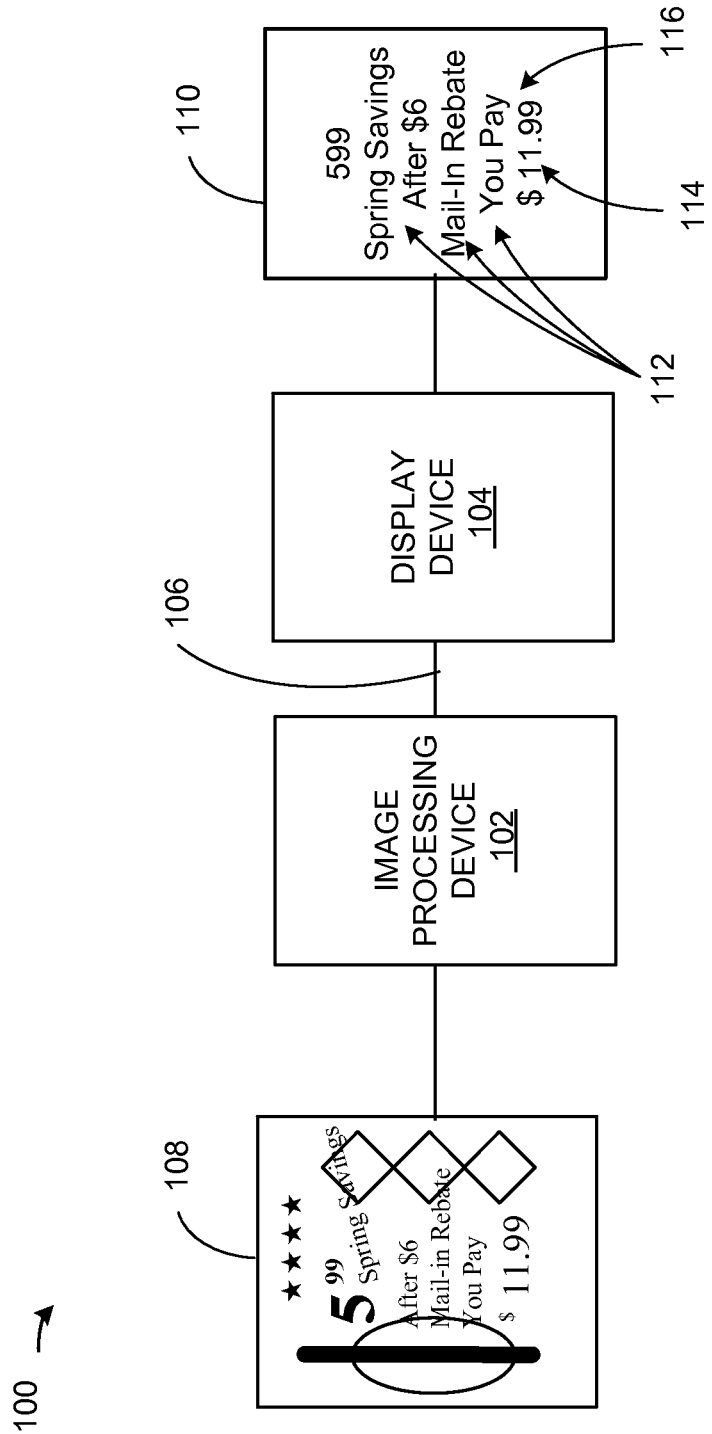
FIG. 1 is a block diagram of an image processing system in an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGs. Where multiple embodiments are disclosed and described, having some features in common, for clarity and ease of illustration, description, and comprehension thereof, similar and like features one to another will ordinarily be described with like reference numerals.

The term "module" referred to herein can include software, hardware, or a combination thereof in the present invention in accordance with the context used.

Referring now to FIG. 1, therein is shown a block diagram of an image processing system 100 in an embodiment of the present invention. The image processing system 100 can receive a source image 108 in an image processing device 102 and generate text units 112 for display on a display device 104. The image processing device 102 can be coupled to the display device 104 with a communication path 106. The text units 112 can be part of a processed text image 110 having the text units 112 in locations corresponding to the original location in the source image 108.

The source image 108 is a picture including elements representing text in a cluttered and unstructured picture. The source image 108 includes a mixture of text and graphics. For example, the source image 108 can be a representation of a print advertisement with text and graphical elements.

The cluttered picture can include text completely or partially overlaid on top of graphical elements. The cluttered picture can include complex graphical elements located on or near textual elements. The graphical elements can include other image, color segments, graphical characters, design, text effects, shaded elements, or a combination thereof.

The source image 108 can be unstructured and include textual elements in irregular configurations. The textual elements can include variations in size, font, style, stroke size, text color, text background color, or a combination thereof. The boundary of characters can be distorted due to printing artifacts, blurriness, noise, lighting variations, skew, errors, or a combination thereof.

The source image 108 can include textual elements with a small number of individual text characters. The source image 108 can include textual elements having two or more characters.

The processed text image 110 can be a visual representation of the source image 108 with text units 112 representing the extracted textual elements. Each of the text elements 116 can represent a group of related textual characters extracted from the source image 108.

Each of the text units 112 can include a text unit location 114 representing the location of the textual elements of the source image 108. The text units 112 are graphical representations of a group of text characters. The text units 112 can be processed with optical character recognition to generate the text characters represented in the graphic of the text units 112.

It has been discovered that tagging each of the text units 112 with the text location 114 within the source image 108 simplifies the reconstruction of complex images and allows the accurate merger of text and graphics after optical character recognition has been performed.

Figure 2:
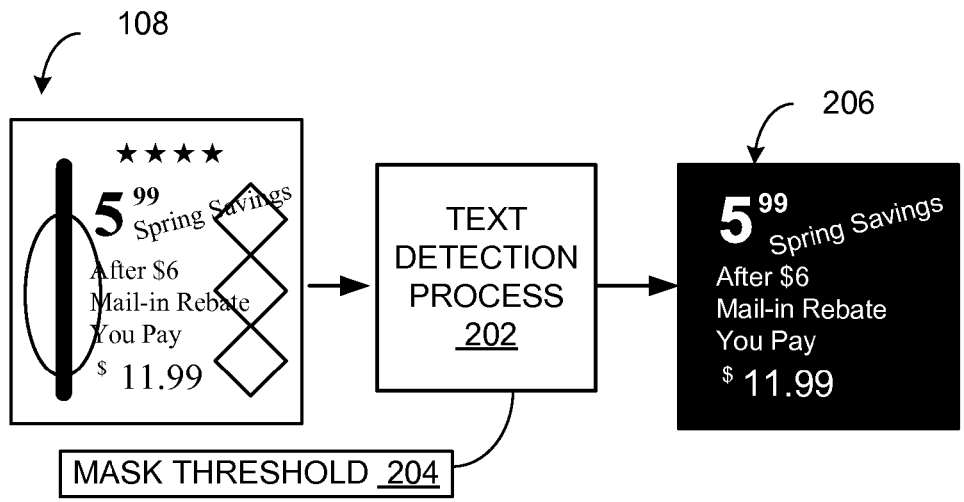
FIG. 2 is an example of a text detection process.

Referring now to FIG. 2, therein is shown an example of a text detection process 202. The text detection process 202 can generate a binary mask image 206 from the source image 108.

The text detection process 202 can generate the binary mask image 206 in a variety of ways. For example, the text detection process 202 can identify text and non-text areas, perform graphical filtering, image thresholding, or a combination thereof.

In an illustrative example, the text detection process 202 can apply a mask threshold 204 to the source image 108 to generate the binary mask image 206. The binary mask image 206 is a digital representation of the source image 108. Each pixel of the source image 108 can be replaced with a 1 or 0 to form the binary mask image 206. The value of each pixel is based on the intensity of the pixel being greater than or equal to a mask threshold 204. The binary mask image 206 can represent the text information as a positive or negative image by swapping the meaning of values of 1 and 0 to represent text or non-text.

The mask threshold 204 is a value used to discriminate target pixels representing text elements from background pixels in the source image 108. The mask threshold 204 can be calculated in a variety of ways. The mask threshold 204 can be calculated based on pre-determined characterizations of types of images, based on intensity, based on color, or a combination thereof. For example, the mask threshold 204 can be an intensity value where all pixels with an intensity greater than or equal to the mask threshold 204 are set to 1, while pixels with an intensity less than the mask threshold 204 are set to 0.

The mask threshold 204 can be calculated for the entirety of the source image 108 or for subsets of the source image 108. For example, the mask threshold 204 can vary by dividing the source image 108 into multiple regularly shaped regions, based on the complexity of a region, based of identified regions, based on an image processing algorithm, or a combination thereof.

It has been discovered that applying the mask threshold 204 to the source image 108 to generate the binary mask image 206 reduces computing time and increases efficiency of the text detection process. Applying the mask threshold 204 identifies areas of interest and reduces the number of pixels and regions to be processed for text detection.

Figure 3:
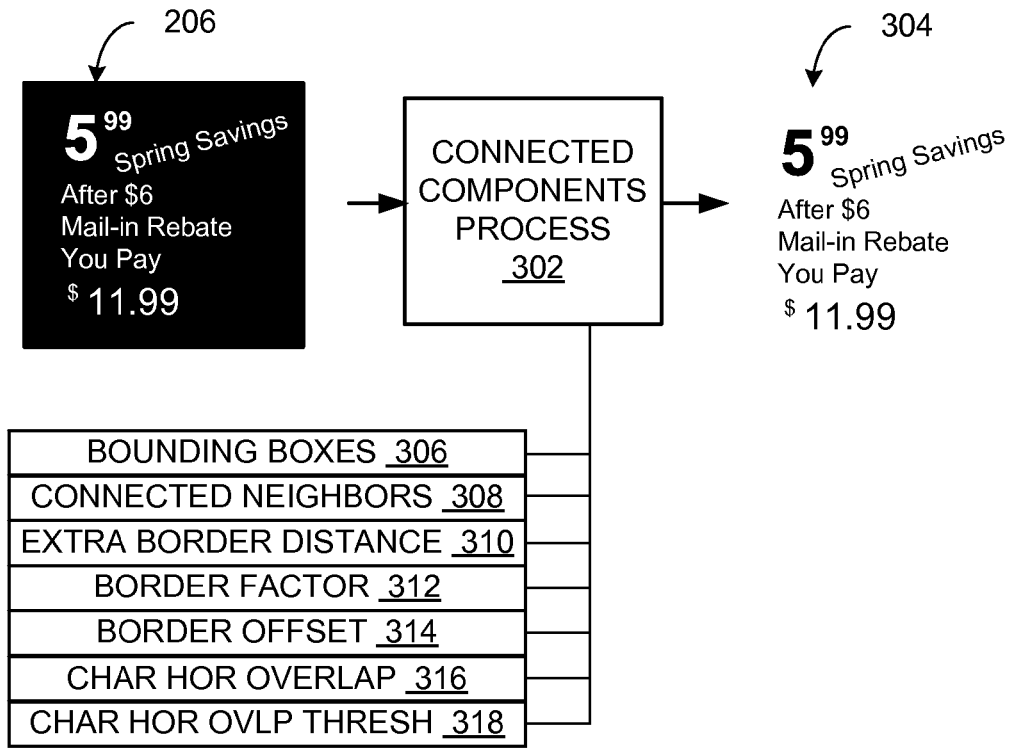
FIG. 3 is an example of a connected components process.

Referring now to FIG. 3 therein is shown an example of a connected components process 302. The connected components process 302 can identify character targets 304 in the binary mask image 206. The character targets 304 are connected groups of pixels in the binary mask image 206.

Each of the character targets 304 can represent one or more text characters. The character targets 304 can include the location of the character target within the source image 108 of FIG. 1. The character targets 304 cover contiguously connected portions of the binary mask image 206 where all of the pixels with value "1" in the character targets 304 are connected and neighbors.

Once the character targets 304 are identified, bounding boxes 306 can be defined for each of the character targets 304. The bounding boxes 306 are rectangular areas that encompass all of the pixels associated with one of the character targets 304.

The bounding boxes 306 can be formed found the character targets 304 to exclude extraneous pixel information that are not part of the character targets 304. For example, extraneous pixel information can include pixel artifacts such as dots, small objects, or a combination thereof.

The character targets 304 that are associated with one another can be grouped by finding connected neighbors 308. Two of the character targets 304 can be grouped together by expanding the bounding boxes 306 of each of the character targets 304 horizontally on the left and right side of each of the bounding boxes 306. If the extension of the bounding boxes 306 of two of the character targets 304 overlap, then the character targets 304 form one of the connected neighbors 308.

The character targets 304 overlap where a horizontal overlap 316 is greater than a horizontal overlap threshold 318. The horizontal overlap 316 is the amount the bounding boxes 306 of two of the character targets 304 overlap. The horizontal overlap threshold 318 is the minimum overlap and can be a value of 1 pixel.

Each of the bounding boxes 306 can be expanded horizontally by an extra border distance 310. The extra border distance 310 can be based on α, which is a border factor 312 and c, which is a border offset 314. The extra border distance 310 is based on the formula:

$$\text{Extra Border distance} = \alpha \cdot \text{Character target height} + c \quad (1)$$

Where: $\alpha = \frac{1}{3}$ and $c = 5$

The values for α and c have been empirically determined.

The character targets 304 can be designated one of the connected neighbors 308 if the expanded regions covered by the bounding boxes 306 overlap. The connected neighbors 308 overlap both vertically and horizontally.

It has been discovered that expanding the bounding boxes 306 to detect overlap increases the accuracy of text detection. Uniformly expanding the bounding boxes 306 based on the height of the character targets 304 can identify larger text relationships between the character targets 304.

Figure 4:
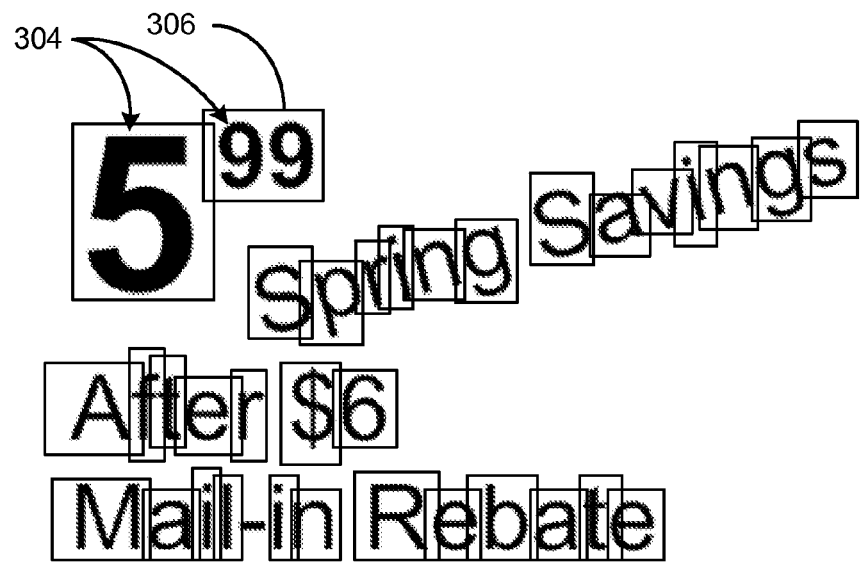
FIG. 4 is an example of the bounding boxes.

Referring now to FIG. 4 therein is shown an example of the bounding boxes 306. Each of the character targets 304 can be associated with one of the bounding boxes 306. Each of the bounding boxes 306 is a rectangular region encompassing all of the pixels of one of the character targets 304.

Figure 5:
FIG. 5 is an example of the text units.

Referring now to FIG. 5 therein is shown an example of the text units 112. The location and size information of the bounding boxes 306 can be used to form the text units 112 from portions of the source image 108. The extracted portions are then grouped together to form the text units 112.

The text units 112 represent a group of related characters in the source image 108 of FIG. 1. For example, the text units 112 can represent words and numbers that are associated by proximity and connectedness. The text units 112 are formed by combining portions of the source image 108 based on the size and location of the connected neighbors 308 that have similar features and overlap vertically and horizontally.

Figure 6:
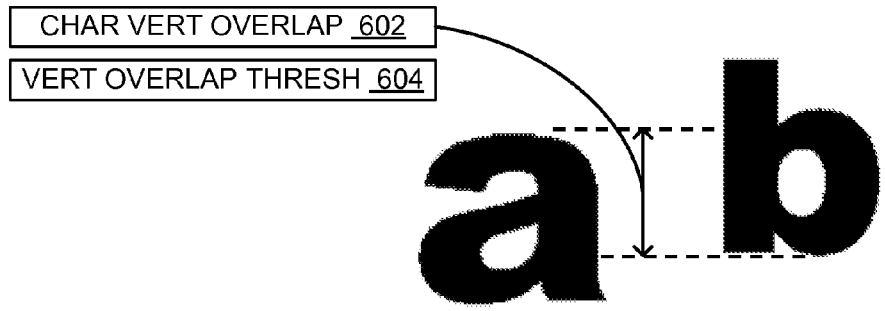
FIG. 6 is an example of vertical overlap.

Referring now to FIG. 6 therein is shown an example of vertical overlap. A character vertical overlap 602 is a value indicating the vertical distance in common between two of the character targets 304 of FIG. 3. The character vertical overlap 602 can be expressed as a percentage, a number of pixels, a length, or a combination thereof.

The character vertical overlap 602 can indicate a degree of related-ness between two of the character targets 304. If the character vertical overlap 602 is greater than or equal to a feature threshold, such as a character vertical overlap threshold 604, then the character targets 304 can be associated with one another.

Figure 7:
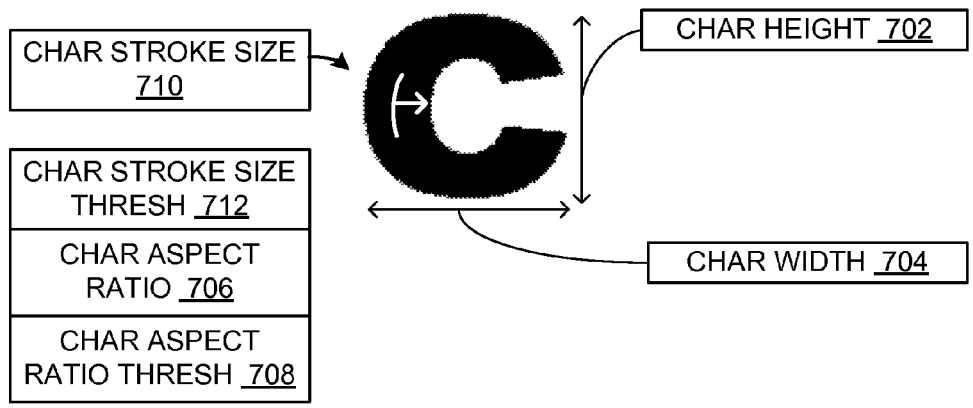
FIG. 7 is an example of character features.

Referring now to FIG. 7 therein is shown an example of character features. The character features can be used to associate the character targets 304 of FIG. 3 with one another.

The character targets 304 can include a character height 702. The character height 702 is a value indicating the vertical extent of one of the character targets 304. The character height 702 can be expressed in pixels, distance, or a combination thereof.

The character targets 304 can include a character width 704. The character width 704 is a value representing the horizontal size of one of the character targets 304. The character width 704 can be expressed in pixels, distance, or a combination thereof.

The character targets 304 can include a character aspect ratio 706. The character aspect ratio 706 is the ratio between the character height 702 and the character width 704. The character aspect ratio 706 is calculated by dividing the character height 702 by the character width 704. The character targets 304 are similar if the character aspect ratio 706 of one of the character targets 304 is within a character aspect ratio threshold 708 of another of the character targets 304. The character aspect ratio 706 is one of the character features.

The character targets 304 can include a character stroke size 710. The character stroke size 710 is a value representing the width of a line element forming a portion of one of the character targets 304. The character stroke size 710 can be expressed in pixels, distance, or a combination thereof.

The character targets 304 can include an associated value for the feature threshold, such as a character stroke size threshold 712. The character stroke size threshold 712 is a maximum width for a line element to represent a valid character. The character stroke size threshold 712 can be expressed in pixels, distance, or a combination thereof.

The character stroke size 710 less than the character stroke size threshold 712 can be designated as a valid character. Comparing the character stroke size 710 to the character stroke size threshold 712 can discriminate large graphical elements from text elements.

Figure 8:
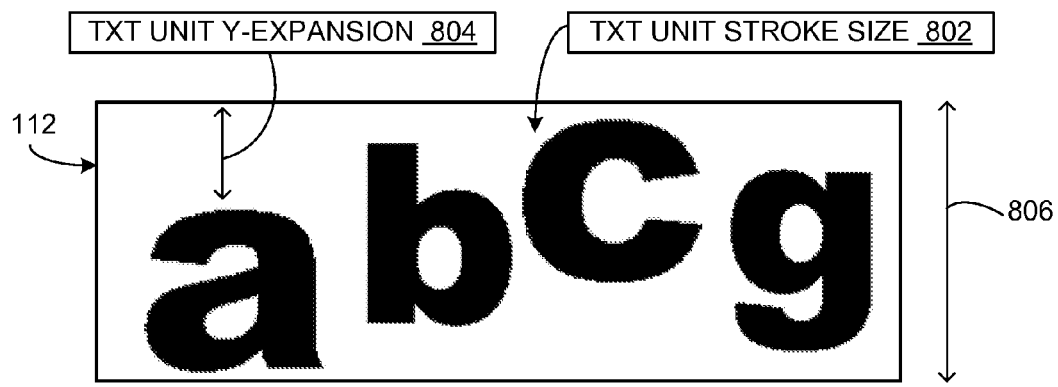
FIG. 8 is an example of y-expansion.

Referring now to FIG. 8, therein is shown an example of y-expansion. The text units 112 are graphical representations of a set of characters. The text units 112 can include the character targets 304 of FIG. 3 that are associated with one another and are offset vertically.

The text units 112 can have a text unit stroke size 802. The text unit stroke size 802 is the maximum of the character stroke size 710 of FIG. 7 of the character targets 304 associated with one of the text units 112.

Each of the text units 112 can have a text unit y-expansion 804. The text unit y-expansion 804 is the additional vertical expansion of one of the text units 112 to accommodate all of the character targets 304.

The text units 112 can have a text unit height 806. The text unit height 806 is a value representing the vertical extent of the character targets 304 associated with one of the text units 112. For example, the vertical position of each of the characters in one of the text units 112 can have a different vertical starting position and overlap. Connected neighbors can be merged into one of the text units 112 if their stroke sizes are similar and their y-expansion 804 have sufficient overlap, such as an overlap of ⅓ or more.

Figure 9:
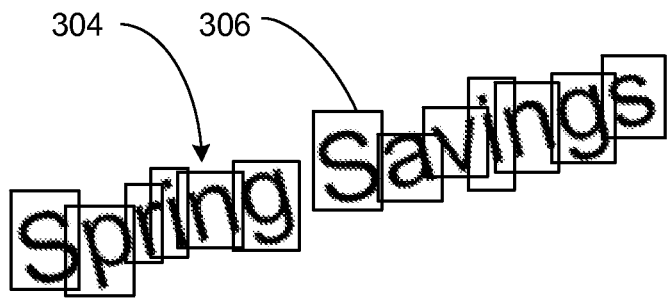
FIG. 9 is an example of the character targets.

Referring now to FIG. 9 therein is shown an example of the character targets 304. One of the text units 112 of FIG. 1 can include characters targets 304 oriented at an angle from the horizontal. Each of the character targets 304 can be surrounded by one of the bounding boxes 306. The character height 702 of FIG. 7 for each of the character targets 304 can be calculated. A frequency analysis or histogram can be performed to determine the most frequent value for the character height 702 for the character targets 304.

Figure 10:
FIG. 10 is an example of a text unit baseline.

Referring now to FIG. 10 therein is shown an example of a text unit baseline 1002. The text unit baseline 1002 is a line running the center of the text units 112 of FIG. 1 that indicate the angle from the horizontal for one of the text units 112.

The text unit baseline 1002 can be calculated in a variety of ways. For example, the text unit baseline 1002 can be established by calculating a line to pass through the centers of each of the character targets 304 of FIG. 3 having the most frequent height. In another example, the text unit baseline 1002 can be calculated through the centroid of the entirety of one of the text units 112. In yet another example, the text unit baseline 1002 can be the line best fitting the centers of all of the character targets 304 of one of the text units 112.

Figure 11:
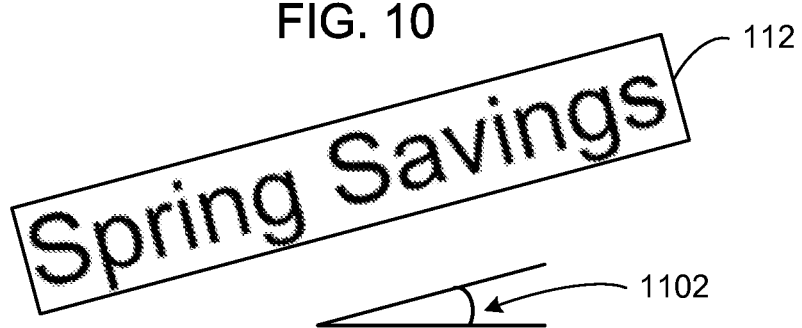
FIG. 11 is an example of a text unit baseline angle.

Referring now to FIG. 11, therein is shown an example of the text unit baseline angle 1102 of one of the text units 112. The text unit baseline angle 1102 is the angle between the text unit baseline 1002 of FIG. 10 and the horizontal axis.

Figure 12:
FIG. 12 is an example of straightening the text units.

Referring now to FIG. 12, therein is shown an example of straightening the text units 112. One of the text units 112 has been rotated by the text unit baseline angle 1102 of FIG. 11 and aligned horizontally.

Figure 13:
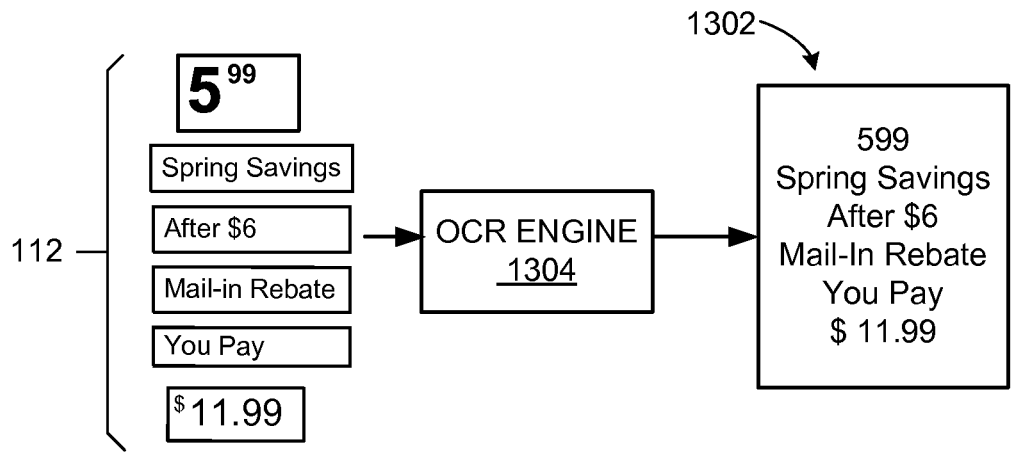
FIG. 13 is an example of optical character recognition process.

Referring now to FIG. 13, therein is shown an example of an optical character recognition process. Each of the text units 112 extracted from the source image 108 of FIG. 1 can be passed to an optical character recognition engine 1304 and converted to an output text 1302. Each of the output text 1302 can be associated with one of the text units 112.

Each of the output text 1302 can include additional metadata relating the output text 1302 back to the source image 108. Each of the output text 1302 can include the text unit location 114 of FIG. 1 indicating the location of the text in the source image 108 and the text unit baseline angle 1102 of FIG. 11.

It has been discovered that identifying the shape and location of the text units 112 in the binary mask image 206 while extracting the text units 112 from the source image 108 improves text recognition quality. Extracting the text units 112 from the source image 108 provides the highest level of information and identifying the text units 112 from the binary mask image 206 of FIG. 2 reduces processing time by using the simplified data of the binary mask image 206.

Figure 14:
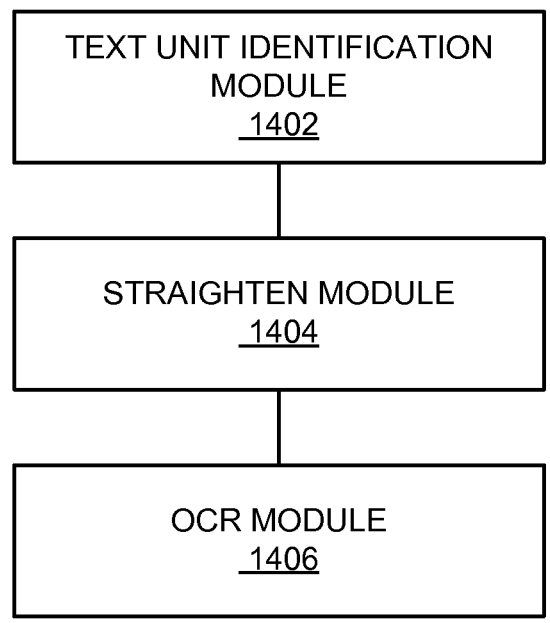
FIG. 14 is a process flow of the image processing system with layout analysis.

Referring now to FIG. 14, therein is shown a process flow of the image processing system with layout analysis. The process flow can include a text unit identification module 1402, a straighten module 1404, and the optical character recognition module 1406.

The text unit identification module 1402 can identify and extract the character targets 304 of FIG. 3 from the source image 108 of FIG. 1 and merge the character targets 304 to form the text units 112 of FIG. 1.

The text unit identification module 1402 can perform a text detection operation on the source image 108 to form the binary mask image 206 of FIG. 2. The binary mask image 206 can be formed by applying the mask threshold 204 of FIG. 2 to the source image 108. The binary mask image 206 can have a value of 1 for pixels having a value greater than or equal to the mask threshold 204. The binary mask image 206 can have a value of 0 for pixels having a value less than the mask threshold 204.

The text unit identification module 1402 can form the character targets 304 by identifying connected groups of pixels in the binary mask image 206. The character targets 304 can be grouped together by forming the bounding boxes 306 of FIG. 3 around each of the character targets 304, horizontally expanding the bounding boxes 306, and associating the character targets 304 having the bounding boxes 306 that overlap one another forming connected neighbors.

The text unit identification module 1402 can form the text units 112 by grouping together the character targets 304 having similar features. For example, the character targets 304 can be grouped into one of the text units 112 based on similar values of the character stroke size 710 of FIG. 7, the character height 702 of FIG. 7, the character width 704 of FIG. 7, the character aspect ratio 706 of FIG. 7, and the character vertical overlap 602 of FIG. 6 with neighboring one of the character targets 304.

The text units 112 are graphical elements containing textual characters and a graphical background. The text units 112 can be extracted from a portion of the source image 108. Alternatively, the text units 112 can be extracted from a portion of a processed version of the source image 108, such as the binary mask image 206 of the source image 108. For example, the one of the text units 112 can be an extracted portion of the source image 108 encompassing a word of text in the source image 108.

The straighten module 1404 can horizontally align the character targets 304 of one of the text units 112. The straighten module 1404 can compensate for image skewness caused by camera angle, uneven document surfaces, printing style, printing errors, or a combination thereof. Straightening the text units 112 can improve text recognition accuracy and reduce distortion.

The straighten module 1404 can quantize the height of the text components in the text units 112. The most frequent height amount the quantized heights of the text units 112 can be determined using frequency analysis, such as a histogram. The text unit baseline 1002 of FIG. 10 is a line calculated between the centers of the character targets 304 with the most frequent height. The text unit baseline angle 1102 of FIG. 11 is the angle between the text unit baseline 1002 and the horizontal axis. The text unit baseline angle 1102 can be used to rotate one of the text units 112 toward the horizontal.

The straighten module 1404 can rotate all of the text units 112 toward the horizontal. Once completed, the control flow can pass to the optical character recognition module 1406.

The optical character recognition module 1406 can recognize the text characters in each of the text units 112 and generate the output text 1302 of FIG. 13 for display. The optical character recognition module 1406 can use any known method for performing optical character recognition (OCR) on the text units 112 to generate the output text 1302. After the output text 1302 has been generated, it can be displayed on the display device 104 of FIG. 1.

Figure 15:
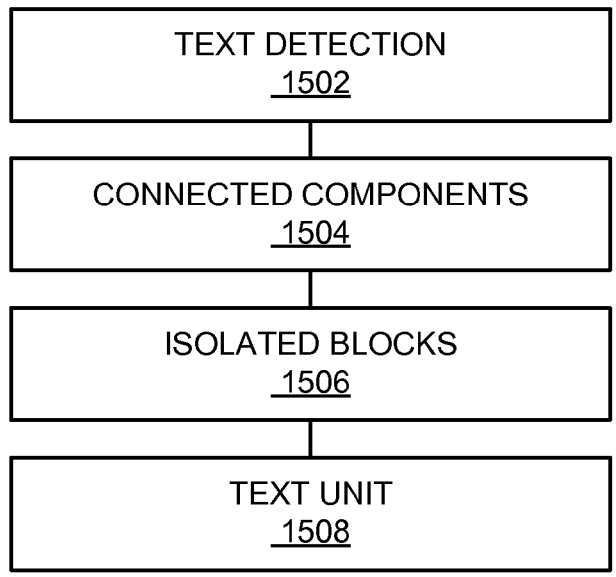
FIG. 15 is an example of the text unit identification module.

Referring now to FIG. 15 therein is shown an example of the text unit identification module 1402. The text unit identification module 1402 can extract the text units 112 of FIG. 1 from the source image 108 of FIG. 1.

The text unit identification module 1402 can include a text detection module 1502, a connected components module 1504, a text unit module 1508, and an isolated blocks module 1506.

The text detection module 1502 can generate the binary mask image 206 of FIG. 2 based on the source image 108. The binary mask image 206 can be generated by applying the mask threshold 204 of FIG. 2 to the source image 108. Each pixel in the source image 108 corresponds to the pixel in the same location in the binary mask image 206. If the value of a pixel in the source image 108 is greater than or equal to the mask threshold 204, then the corresponding pixel in the binary mask image 206 is set to 1. If the value of a pixel in the source image 108 is less than the mask threshold 204, then the corresponding pixel in the binary mask image 206 is set to 0.

The value of the pixel in the source image 108 can be determined in a variety of ways. For example, the value of the pixel can represent the intensity, a single color plane intensity, hue, chroma, brightness, an average of multiple color planes, or a combination thereof.

The mask threshold 204 can represent a variety of values. For example, the mask threshold 204 can be a single value, an array of values, a value varying by location within the source image 108, or a combination thereof.

The binary mask image 206 is complete when the mask threshold 204 has been applied to all pixels in the source image 108. After completion, the control flow can pass to the connected components module 1504.

The connected components module 1504 can generate the character targets of 304 of FIG. 3 by identifying groups of the pixels of the binary mask image 206 that are connected. Connected pixels are pixels having the same value that are directly adjacent to another pixel with the same value. For example, the connected pixels can all have a value of "1".

The groups of connected pixels can be separated from other groups of connected pixels by a border of pixels having a different value. For example, the connected pixels forming one of the character targets 304 and having a common value of "1" can be surrounded by a border of pixels having a value of "0".

The character targets 304 are connected groups of pixels representing one or more text characters in the binary mask image 206. Because the binary mask image 206 can varying in terms of quality, the pixels within one of the character targets 304 may include more than a single text character. In addition, the character targets 304 can include addition background pixels that are unrelated to the text characters.

The connected components module 1504 can identify all of the character targets 304 by iterating over all of the pixels in the binary mask image 206. Once all of the character targets 304 have been identified in the binary mask image 206, the control flow can pass to the isolated blocks module 1506.

The isolated blocks module 1506 can discard some of the character targets 304 that are not related to other textual elements. The isolated blocks module 1506 can discard one of the character targets 304 if no other one of the character targets 304 can be detected as one of the connected neighbors 308 of FIG. 3. If none of the character targets 304 is within the extra border distance 310 of FIG. 3 of the selected one of the character targets 304, then that one of the character targets 304 does not represent part of one of the text units 112 and is removed from the list of the character targets 304.

However, if the character aspect ratio 706 of the selected one of the character targets 304 is less than 0.5, then the selected on of the character targets 304 is not discarded. Having the character aspect ratio 706 less than 0.5 can indicate that the selected one of the character targets 304 include multiple text characters that are falsely connected in the binary mask image 206. The false connection can be due to a variety of reasons including printing artifacts, errors of the detection algorithm, noise, thresholding problems, or a combination thereof.

The isolated blocks module 1506 can remove the small and isolated elements of the binary mask image 206 of FIG. 2. Once the isolate blocks module 1506 has completed, the control flow can pass to the text unit module 1508.

The text unit module 1508 can form the text units 112 by grouping together the character targets 304 that are related to one another. The text units 112 can be formed by iterating through each of the character targets 304 and merging each of the character targets 304 into one of the text units 112 based on the features of the character targets 304.

The character targets 304 can have character features such as the character height 702 of FIG. 7, the character width 704 of FIG. 7, the character aspect ratio 706 of FIG. 7, and the character stroke size 710 of FIG. 7. The character height 702 can be calculated by measuring the vertical height of the pixels of the character targets 304. The character width 704 can be calculated by measuring the horizontal width of the pixels of the character targets 304. The character aspect ratio 706 can be calculated as the character height 702 divided by the character width 704.

The character stroke size 710 can be calculated by identifying and measuring the width of a segment of one of the character targets 304. The segments of the character targets 304 can be identified in a variety of ways. For example, the segments can be identified based on similar sizes of horizontal, vertical, or curved elements within the character targets 304. In another example, the most common width of the identified elements of the character targets 304 can be the stroke size. The character stroke size 710 can be measured as the distance across the entire segment, distance from the center of the segment to the outside, or a combination thereof.

The character targets 304 can be designed the connected neighbors 308 based on the character features of the character targets 304. The connected neighbors 308 are two of the character targets 304 that should be grouped together to form a larger text object, such as a word or sentence.

The connected neighbors 308 can be detected by first defining the bounding boxes 306 of FIG. 3 for each of the character targets 304 in the binary mask image 206 and then expanding the bounding boxes 306 horizontally to detect overlap. The bounding boxes 306 define rectangular areas around the character targets 304 having all of the pixels of one of the character targets 304 within one of the bounding boxes 306.

Small objects and dots can be expressly excluded. For example, if one of the character targets 304 is below a size threshold, such as the minimum character width, then the selected one of the character targets 304 can be removed and not used to form the text units 112.

To detect one of the connected neighbors 308, each of the bounding boxes 306 can be expanded in the horizontal direction on the left and right side. The bounding boxes 306 can be expanded by the extra border distance 310. For example, the extra border distance 310 can be calculated using Equation (1). If the bounding boxes 306 of two of the character targets 304 overlap, then the character targets 304 are designated as one of the connected neighbors 308.

The connected neighbors 308 can be merged into one of the text units 112 by determining the character vertical overlap 602 of FIG. 6 between two of the connected neighbors 308. If the one of the text units 112 and one of the connected neighbors 308 have a degree of vertical overlap greater than the character vertical overlap 602, then one of the connected neighbors 308 can be merged into one of the text units 112.

The character vertical overlap 602 can be determined in a variety of ways. For example, the character vertical overlap 602 can be a pre-determined value, a location dependent value, a character context value, or a combination thereof. In another example, the character vertical overlap 602 can be calculated by determining the minimum of the text unit height 806 of FIG. 8 or the character height 702 of one of the connected neighbors 308 and dividing by three.

The character vertical overlap 602 can be calculated between one of the text units 112 and one of the connected neighbors 308. The character vertical overlap 602 is the vertical extent that one of the text units 112 and one of the connected neighbors 308 share. For example, one of the text units 112 and one of the connected neighbors 308 that are adjacent, have the bottom of the character targets 304 at the same vertical position, and have the same character height 702 can have a vertical overlap of one hundred percent. The character vertical overlap 602 can be expressed as a percentage, a ratio, a fractional value, or a combination thereof.

It has been discovered that grouping the character targets 304 having similar values of the character height 702 can improve text recognition accuracy by finding text with similar font sizes. Because many characters have similar sizes in a particular font family, grouping by using the character height 702 can quickly identify characters that should be grouped.

It has been discovered that grouping the character targets 304 having significant values of the character vertical overlap 602 can improve text recognition accuracy by finding characters that are related based on position. Small groups of characters that correlate vertically can be related and quickly identified as characters that should be grouped.

The character targets 304 can be merged into one of the text units 112 where the character targets 304 have similar stroke size and the character vertical overlap 602 is greater than or equal to the character vertical overlap 602. Similarity of the character stroke size 710 can be determined by calculating the absolute value of the difference between the text unit stroke size 802 of FIG. 8 and the character stroke size 710 of one of the connected neighbors 308 and then determining if the difference is less than the minimum of the text unit stroke size 802, the character stroke size 710 one of the connected neighbors 308, and a value of three pixels.

It has been discovered that text units 112 can be formed faster and more accurately by merging the connected neighbors 308 having a similar values of the character stroke size 710 and a significant overlap of at least one third of the character height of either one of the text units 112 or one of the connected neighbors 308. Forming the text units 112 based on a multiple element correlation of the properties of the characters improves the accuracy of the formation of the text units 112.

It has been discovered that detecting the text units 112 can improve the ability to detect textual elements when the source image 108 is complex. Reducing the impact of irregular background graphical element by grouping together nearby textual elements that have similar alignment and character features provides improved detection of the text units 112.

Figure 16:
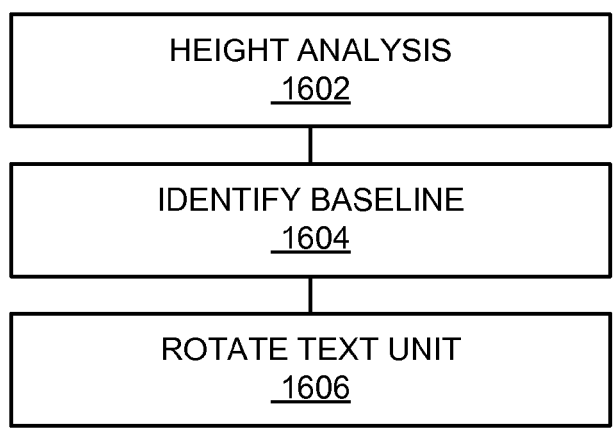
FIG. 16 is an example of the straighten module.

Referring now to FIG. 16 therein is shown an example of the straighten module 1404. The straighten module 1404 can improve optical character recognition by aligning the text units 112 of FIG. 1 along the horizontal axis. The straighten module 1404 can include a height analysis module 1602, an identify baseline module 1604, and a rotate text units module 1606.

The height analysis module 1602 can quantize the height of the character targets 304 of FIG. 3 associated with one of the text units 112. The height analysis module 1602 can determine the character height 702 of FIG. 7 of each of the character targets 304 in one of the text units 112. For example, the individual heights can be assembled into a list or other data structure.

The height analysis module 1602 can calculate the most frequent height in the list of the character height 702 for the character targets 304 of one of the text units 112. Finding the most frequent height can identify textual elements with similar character features. Once the height analysis module 1602 has been completed, the control flow can pass to the identify baseline module 1604.

The identify baseline module 1604 can calculate the text unit baseline 1002 of FIG. 10. The text unit baseline 1002 is a line indicating the degree of rotation from the horizontal for one of the text units 112.

The identify baseline module 1604 can identify the character targets 304 having the most frequent value for the character height 702 and fit a line though the center of each of the character targets 304. By identifying the character targets 304 that are similar because they have common heights, the identify baseline module 1604 can find the line that best represents the text unit baseline angle 1102 of FIG. 11 which is the angle from the horizontal of one of the text units 112.

Calculating the line through the center of each of the character targets 304 having the most frequent height can be performed in a variety of ways. For example, the best line can directly connect each of the centers of the character targets 304. In another example, the best line can be calculated that minimizes the distance between all of the centers and the line.

It has been discovered that identifying the baseline by fitting a line through the centers of the character targets 304 having the most frequent value for the character height 702 can improve performance and reduce compute time for processing the source image 108 of FIG. 1 and the binary mask image 206 of FIG. 2. Because many textual elements have similar heights in most fonts, the line through the centers will determine an accurate baseline with a limited amount of compute power.

The rotate text units module 1402 of FIG. 14 can determine the text unit baseline angle 1102 and rotate one of the text units 112 to be horizontally aligned. The text unit baseline angle 1102 can be determined by calculating the angular difference between the text unit baseline 1002 and the horizontal axis. Once the text unit baseline angle 1102 has been determined, the selected one of the text units 112 can be rotated by the text unit baseline angle 1102 toward the horizontal.

The rotate text units module 1402 can horizontally align all of the text units 112 and submit each of the text units 112 to the optical character recognition module 1406 of FIG. 14 as separate images. Once all of the text units 112 have been submitted, the control flow can pass to the optical character recognition module 1406.

It has been discovered that rotating one of the text units 112 by the text unit baseline angle 1102 toward the horizontal can improve optical character recognition performance. Horizontally aligned text can be more easily recognized and reduces the computational requirements for text recognition.

Figure 17:
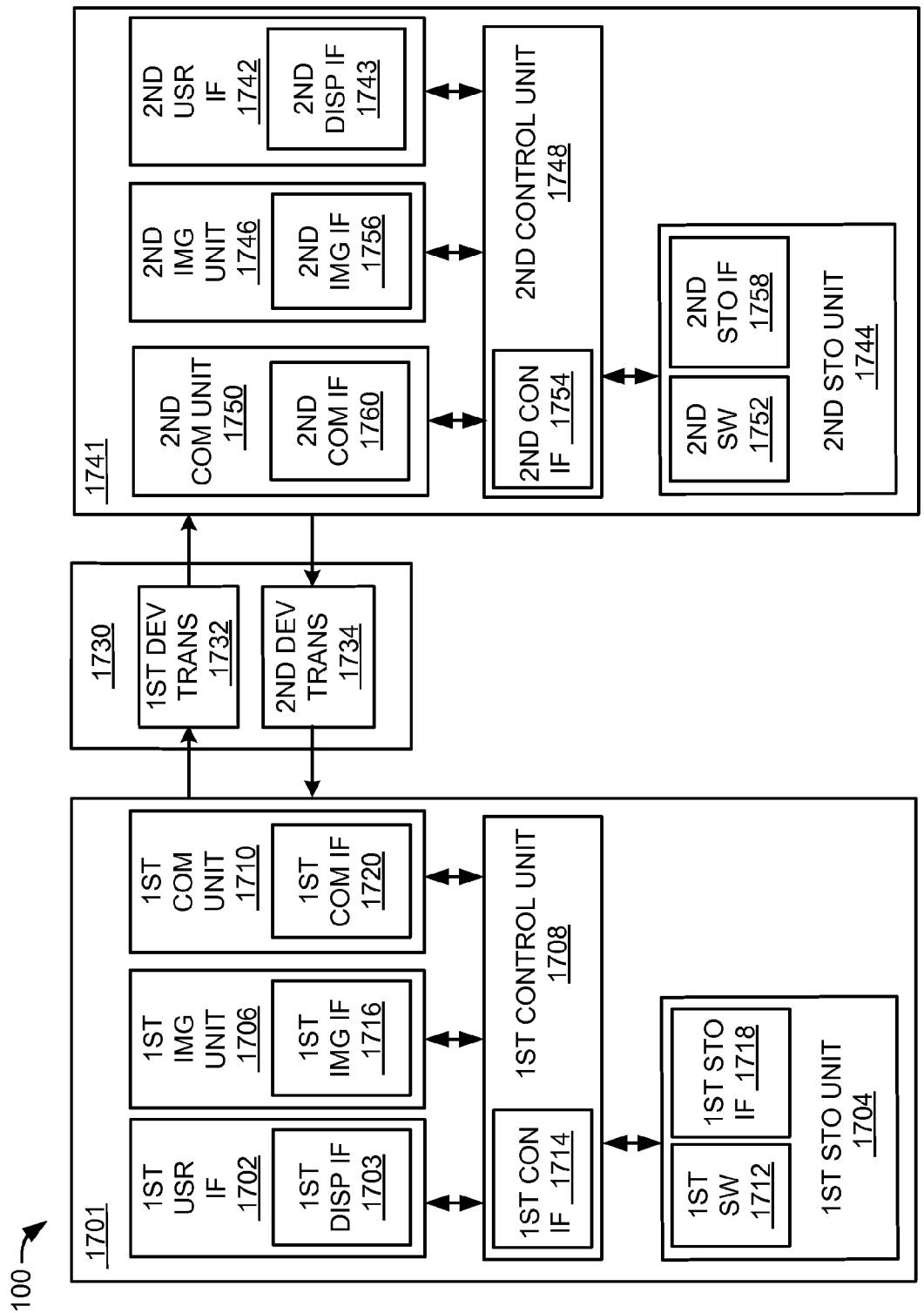
FIG. 17 is a functional block diagram of the image processing system with layout analysis.

Referring now to FIG. 17, therein is shown a functional block diagram of the image processing system 100 with layout analysis. The image processing system 100 can include a first device 1701, a second device 1741 and a communication link 1730.

The image processing system 100 can be implemented using the first device 1701, the second device 1741, and the communication link 1730. For example, the first device 1701 can implement the image processing device 102 of FIG. 1, the second device 1741 can implement the display device 104 of FIG. 1. and the communication link 1730 can implement the communication path 106 of FIG. 1. However, it is understood that the image processing system 100 can be implemented in a variety of ways and the functionality of the image processing device 102, the display device 104, and the communication path 106 can be partitioned differently over the first device 1701, the second device 1741, and the communication link 1730.

The first device 1701 can communicate with the second device 1741 over the communication link 1730. The first device 1701 can send information in a first device transmission 1732 over the communication link 1730 to the second device 1741. The second device 1741 can send information in a second device transmission 1734 over the communication link 1730 to the first device 1701.

For illustrative purposes, the image processing system 100 is shown with the first device 1701 as a client device, although it is understood that the image processing system 100 can have the first device 1701 as a different type of device. For example, the first device can be a server.

Also for illustrative purposes, the image processing system 100 is shown with the second device 1741 as a server, although it is understood that the image processing system 100 can have the second device 1741 as a different type of device. For example, the second device 1741 can be a client device.

For brevity of description in this embodiment of the present invention, the first device 1701 will be described as a client device, such as a video camera, smart phone, or a combination thereof. The present invention is not limited to this selection for the type of devices. The selection is an example of the present invention.

The first device 1701 can include a first control unit 1708. The first control unit 1708 can include a first control interface 1714. The first control unit 1708 can execute a first software 1712 to provide the intelligence of the image processing system 100.

The first control unit 1708 can be implemented in a number of different manners. For example, the first control unit 1708 can be a processor, an embedded processor, a microprocessor, a hardware control logic, a hardware finite state machine (FSM), a digital signal processor (DSP), or a combination thereof.

The first control interface 1714 can be used for communication between the first control unit 1708 and other functional units in the first device 1701. The first control interface 1714 can also be used for communication that is external to the first device 1701.

The first control interface 1714 can receive information from the other functional units or from external sources, or can transmit information to the other functional units or to external destinations. The external sources and the external destinations refer to sources and destinations external to the first device 1701.

The first control interface 1714 can be implemented in different ways and can include different implementations depending on which functional units or external units are being interfaced with the first control interface 1714. For example, the first control interface 1714 can be implemented with electrical circuitry, microelectromechanical systems (MEMS), optical circuitry, wireless circuitry, wireline circuitry, or a combination thereof.

The first device 1701 can include a first storage unit 1704. The first storage unit 1704 can store the first software 1712. The first storage unit 1704 can also store the relevant information, such as images, syntax information, video, profiles, display preferences, sensor data, or any combination thereof.

The first storage unit 1704 can be a volatile memory, a nonvolatile memory, an internal memory, an external memory, or a combination thereof. For example, the first storage unit 1704 can be a nonvolatile storage such as non-volatile random access memory (NVRAM), Flash memory, disk storage, or a volatile storage such as static random access memory (SRAM).

The first storage unit 1704 can include a first storage interface 1718. The first storage interface 1718 can be used for communication between the first storage unit 1704 and other functional units in the first device 1701. The first storage interface 1718 can also be used for communication that is external to the first device 1701.

The first device 1701 can include a first imaging unit 1706. The first imaging unit 1706 can capture the source image 108 of FIG. 1 from the real world. The first imaging unit 1706 can include a digital camera, a video camera, an optical sensor, or any combination thereof.

The first imaging unit 1706 can include a first imaging interface 1716. The first imaging interface 1716 can be used for communication between the first imaging unit 1706 and other functional units in the first device 1701.

The first imaging interface 1716 can receive information from the other functional units or from external sources, or can transmit information to the other functional units or to external destinations. The external sources and the external destinations refer to sources and destinations external to the first device 1701.

The first imaging interface 1716 can include different implementations depending on which functional units or external units are being interfaced with the first imaging unit 1706. The first imaging interface 1716 can be implemented with technologies and techniques similar to the implementation of the first control interface 1714.

The first storage interface 1718 can receive information from the other functional units or from external sources, or can transmit information to the other functional units or to external destinations. The external sources and the external destinations refer to sources and destinations external to the first device 1701.

The first storage interface 1718 can include different implementations depending on which functional units or external units are being interfaced with the first storage unit 1704. The first storage interface 1718 can be implemented with technologies and techniques similar to the implementation of the first control interface 1714.

The first device 1701 can include a first communication unit 1710. The first communication unit 1710 can be for enabling external communication to and from the first device 1701. For example, the first communication unit 1710 can permit the first device 1701 to communicate with the second device 1741, an attachment, such as a peripheral device or a computer desktop, and the communication link 1730.

The first communication unit 1710 can also function as a communication hub allowing the first device 1701 to function as part of the communication link 1730 and not limited to be an end point or terminal unit to the communication link 1730. The first communication unit 1710 can include active and passive components, such as microelectronics or an antenna, for interaction with the communication link 1730.

The first communication unit 1710 can include a first communication interface 1720. The first communication interface 1720 can be used for communication between the first communication unit 1710 and other functional units in the first device 1701. The first communication interface 1720 can receive information from the other functional units or can transmit information to the other functional units.

The first communication interface 1720 can include different implementations depending on which functional units are being interfaced with the first communication unit 1710. The first communication interface 1720 can be implemented with technologies and techniques similar to the implementation of the first control interface 1714.

The first device 1701 can include a first user interface 1702. The first user interface 1702 allows a user (not shown) to interface and interact with the first device 1701. The first user interface 1702 can include a first user input (not shown). The first user input can include touch screen, gestures, motion detection, buttons, slicers, knobs, virtual buttons, voice recognition controls, or any combination thereof.

The first user interface 1702 can include the first display interface 1703. The first display interface 1703 can allow the user to interact with the first user interface 1702. The first display interface 1703 can include a display, a video screen, a speaker, or any combination thereof.

The first control unit 1708 can operate with the first user interface 1702 to display video information generated by the image processing system 100 on the first display interface 1703. The first control unit 1708 can also execute the first software 1712 for the other functions of the image processing system 100, including receiving video information from the first storage unit 1704 for display on the first display interface 1703. The first control unit 1708 can further execute the first software 1712 for interaction with the communication link 1730 via the first communication unit 1710.

For illustrative purposes, the first device 1701 can be partitioned having the first user interface 1702, the first storage unit 1704, the first control unit 1708, and the first communication unit 1710, although it is understood that the first device 1701 can have a different partition. For example, the first software 1712 can be partitioned differently such that some or all of its function can be in the first control unit 1708 and the first communication unit 1710. Also, the first device 1701 can include other functional units not shown in FIG. 17 for clarity.

The image processing system 100 can include the second device 1741. The second device 1741 can be optimized for implementing the present invention in a multiple device embodiment with the first device 1701. The second device 1741 can provide the additional or higher performance processing power compared to the first device 1701.

The second device 1741 can include a second control unit 1748. The second control unit 1748 can include a second control interface 1754. The second control unit 1748 can execute a second software 1752 to provide the intelligence of the image processing system 100.

The second control unit 1748 can be implemented in a number of different manners. For example, the second control unit 1748 can be a processor, an embedded processor, a microprocessor, a hardware control logic, a hardware finite state machine (FSM), a digital signal processor (DSP), or a combination thereof.

The second control interface 1754 can be used for communication between the second control unit 1748 and other functional units in the second device 1741. The second control interface 1754 can also be used for communication that is external to the second device 1741.

The second control interface 1754 can receive information from the other functional units or from external sources, or can transmit information to the other functional units or to external destinations. The external sources and the external destinations refer to sources and destinations external to the second device 1741.

The second control interface 1754 can be implemented in different ways and can include different implementations depending on which functional units or external units are being interfaced with the second control interface 1754. For example, the second control interface 1754 can be implemented with electrical circuitry, microelectromechanical systems (MEMS), optical circuitry, wireless circuitry, wireline circuitry, or a combination thereof.

The second device 1741 can include a second storage unit 1744. The second storage unit 1744 can store the second software 1752. The second storage unit 1744 can also store the relevant information, such as images, syntax information, video, profiles, display preferences, sensor data, or any combination thereof.

The second storage unit 1744 can be a volatile memory, a nonvolatile memory, an internal memory, an external memory, or a combination thereof. For example, the second storage unit 1744 can be a nonvolatile storage such as non-volatile random access memory (NVRAM), Flash memory, disk storage, or a volatile storage such as static random access memory (SRAM).

The second storage unit 1744 can include a second storage interface 1758. The second storage interface 1758 can be used for communication between the second storage unit 1744 and other functional units in the second device 1741. The second storage interface 1758 can also be used for communication that is external to the second device 1741.

The second storage interface 1758 can receive information from the other functional units or from external sources, or can transmit information to the other functional units or to external destinations. The external sources and the external destinations refer to sources and destinations external to the second device 1741.

The second storage interface 1758 can include different implementations depending on which functional units or external units are being interfaced with the second storage unit 1744. The second storage interface 1758 can be implemented with technologies and techniques similar to the implementation of the second control interface 1754.

The second device 1741 can include a second imaging unit 1746. The second imaging unit 1746 can capture the source image 108 from the real world. The first imaging unit 1706 can include a digital camera, a video camera, an optical sensor, or any combination thereof.

The second imaging unit 1746 can include a second imaging interface 1756. The second imaging interface 1756 can be used for communication between the second imaging unit 1746 and other functional units in the second device 1741.

The second imaging interface 1756 can receive information from the other functional units or from external sources, or can transmit information to the other functional units or to external destinations. The external sources and the external destinations refer to sources and destinations external to the second device 1741.

The second imaging interface 1756 can include different implementations depending on which functional units or external units are being interfaced with the second imaging unit 1746. The second imaging interface 1756 can be implemented with technologies and techniques similar to the implementation of the first control interface 1714.

The second device 1741 can include a second communication unit 1750. The second communication unit 1750 can enable external communication to and from the second device 1741. For example, the second communication unit 1750 can permit the second device 1741 to communicate with the first device 1701, an attachment, such as a peripheral device or a computer desktop, and the communication link 1730.

The second communication unit 1750 can also function as a communication hub allowing the second device 1741 to function as part of the communication link 1730 and not limited to be an end point or terminal unit to the communication link 1730. The second communication unit 1750 can include active and passive components, such as microelectronics or an antenna, for interaction with the communication link 1730.

The second communication unit 1750 can include a second communication interface 1760. The second communication interface 1760 can be used for communication between the second communication unit 1750 and other functional units in the second device 1741. The second communication interface 1760 can receive information from the other functional units or can transmit information to the other functional units.

The second communication interface 1760 can include different implementations depending on which functional units are being interfaced with the second communication unit 1750. The second communication interface 1760 can be implemented with technologies and techniques similar to the implementation of the second control interface 1754.

The second device 1741 can include a second user interface 1742. The second user interface 1742 allows a user (not shown) to interface and interact with the second device 1741. The second user interface 1742 can include a second user input (not shown). The second user input can include touch screen, gestures, motion detection, buttons, slicers, knobs, virtual buttons, voice recognition controls, or any combination thereof.

The second user interface 1742 can include a second display interface 1743. The second display interface 1743 can allow the user to interact with the second user interface 1742. The second display interface 1743 can include a display, a video screen, a speaker, or any combination thereof.

The second control unit 1748 can operate with the second user interface 1742 to display information generated by the image processing system 100 on the second display interface 1743. The second control unit 1748 can also execute the second software 1752 for the other functions of the image processing system 100, including receiving display information from the second storage unit 1744 for display on the second display interface 1743. The second control unit 1748 can further execute the second software 1752 for interaction with the communication link 1730 via the second communication unit 1750.

For illustrative purposes, the second device 1741 can be partitioned having the second user interface 1742, the second storage unit 1744, the second control unit 1748, and the second communication unit 1750, although it is understood that the second device 1741 can have a different partition. For example, the second software 1752 can be partitioned differently such that some or all of its function can be in the second control unit 1748 and the second communication unit 1750. Also, the second device 1741 can include other functional units not shown in FIG. 17 for clarity.

The first communication unit 1710 can couple with the communication link 1730 to send information to the second device 1741 in the first device transmission 1732. The second device 1741 can receive information in the second communication unit 1750 from the first device transmission 1732 of the communication link 1730.

The second communication unit 1750 can couple with the communication link 1730 to send video information to the first device 1701 in the second device transmission 1734. The first device 1701 can receive video information in the first communication unit 1710 from the second device transmission 1734 of the communication link 1730. The image processing system 100 can be executed by the first control unit 1708, the second control unit 1748, or a combination thereof.

The functional units in the first device 1701 can work individually and independently of the other functional units. For illustrative purposes, the image processing system 100 is described by operation of the first device 1701. It is understood that the first device 1701 can operate any of the modules and functions of the image processing system 100. For example, the first device 1701 can be described to operate the first control unit 1708.

The functional units in the second device 1741 can work individually and independently of the other functional units. For illustrative purposes, the image processing system 100 can be described by operation of the second device 1741. It is understood that the second device 1741 can operate any of the modules and functions of the image processing system 100. For example, the second device 1741 is described to operate the second control unit 1748.

For illustrative purposes, the image processing system 100 is described by operation of the first device 1701 and the second device 1741. It is understood that the first device 1701 and the second device 1741 can operate any of the modules and functions of the image processing system 100. For example, the first device 1701 is described to operate the first control unit 1708, although it is understood that the second device 1741 can also operate the first control unit 1708.

The physical transformation from the images of physical objects of the source image 108 to displaying the output text 1302 on the pixel elements of the display device 104 of FIG.

1 results in physical changes to the pixel elements of the display device 104 in the physical world, such as the change of electrical state the pixel element, is based on the operation of the image processing system 100. As the changes in the physical world occurs, such as the motion of the imaging sensor used to capture the source image 108, the movement itself creates additional information, such as the updates to the source image 108, that are converted back into changes in the pixel elements of the display device 104 for continued operation of the image processing system 100.

The first software 1712 of FIG. 17 of the first device 1701 can implement portions of the image processing system 100. For example, the first software 1712 can include the text unit identification module 1402, the straighten module 1404, and the optical character recognition module 1406.

The first control unit 1708 of FIG. 17 can execute the first software 1712 for text unit identification module 1402 to extract the text units 112 from the source image 108. The first control unit 1708 can execute the first software 1712 for the straighten module 1404 to rotate the text units 112 toward the horizontal. The first control unit 1708 can execute the first software 1712 for the optical character recognition module 1406 to generate and display the output text 1302.

The second software 1752 of FIG. 17 of the second device 1741 of FIG. 17 can implement portions of the image processing system 100. For example, the second software 1752 can include the text unit identification module 1402, the straighten module 1404, and the optical character recognition module 1406.

The second control unit 1748 of FIG. 17 can execute the second software 1752 for text unit identification module 1402 to extract the text units 112 from the source image 108. The second control unit 1748 can execute the second software 1752 for the straighten module 1404 to rotate the text units 112 toward the horizontal. The second control unit 1748 can execute the second software 1752 for the optical character recognition module 1406 to generate and display the output text 1302.

The image processing system 100 can be partitioned between the first software 1712 and the second software 1752. For example, the first software 1712 can include the text unit identification module 1402 and the straighten module 1404 and the second software 1752 can include the optical character recognition module 1406. The first control unit 1708 can execute the modules partitioned to the first software 1712. The second control unit 1748 can execute modules partitioned to the second software 1752.

The first control unit 1708 can operate the first communication unit 1710 of FIG. 17 to send the source image 108 or the binary mask image 206 to the second device 1741. The first control unit 1708 can operate the first software 1712 to operate the first imaging unit 1706 of FIG. 17. The second communication unit 1750 of FIG. 17 can send the source image 108 to the first device 1701 over the communication link 1730.

The image processing system 100 describes the module functions or order as an example. The modules can be partitioned differently. For example, the text unit identification module 1402 and the straighten module 1404 can be combined. Each of the modules can operate individually and independently of the other modules.

Furthermore, data generated in one module can be used by another module without being directly coupled to each other. For example, the straighten module 1404 can receive the binary mask image 206 from the text unit identification module 1402.

The modules can be implemented in a variety of ways. The text unit identification module 1402 and the straighten module 1404 can be implemented in hardware accelerators (not shown) within the first control unit 1708 or the second control unit 1748, or can be implemented in hardware accelerators (not shown) in the first device 1701 or the second device 1741 outside of the first control unit 1708 or the second control unit 1748.

Figure 18:
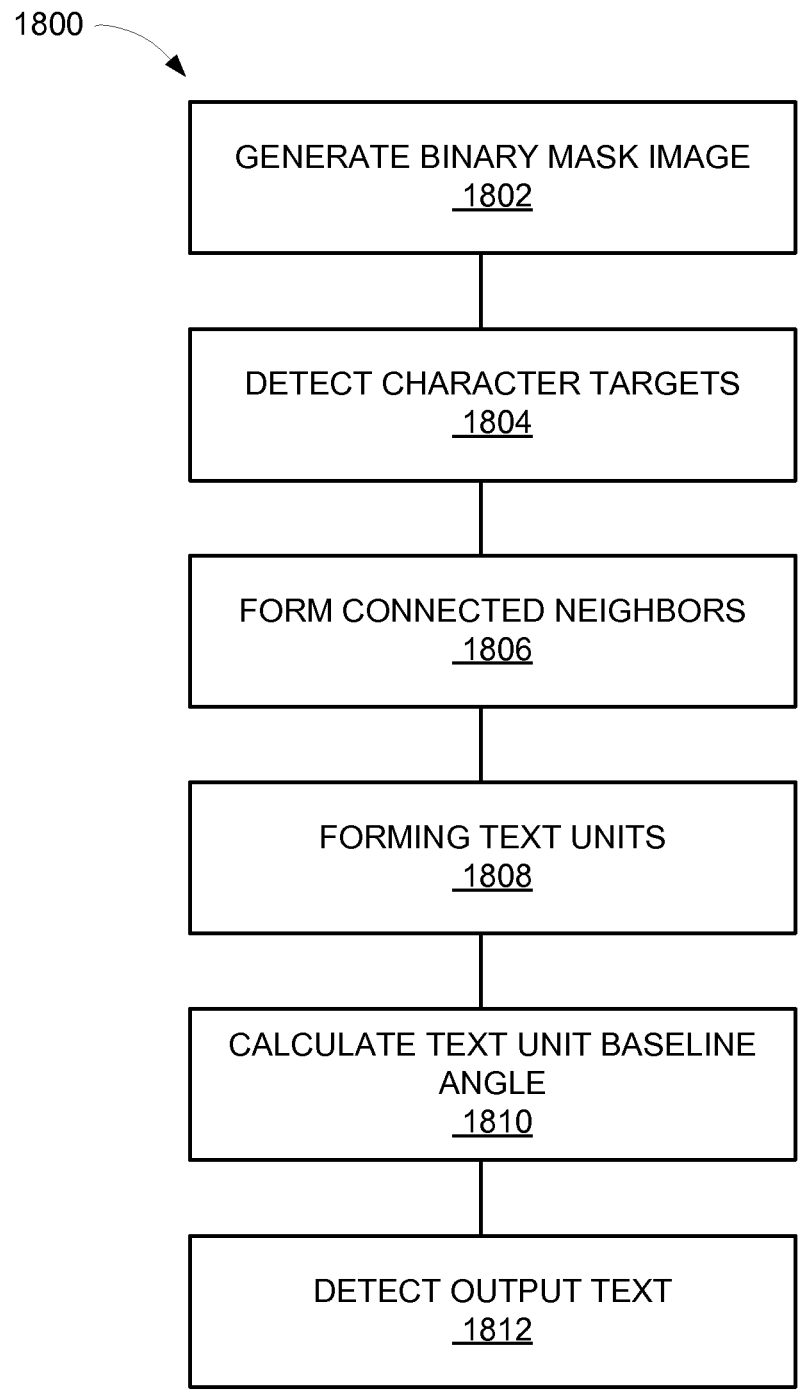
FIG. 18 is an example of a flow chart of a method of operation of the image processing system in a further embodiment of the present invention.

Referring now to FIG. 18, therein is shown an example of a flow chart of a method 1800 of operation of the image processing system in a further embodiment of the present invention. The method 1800 includes: generating a binary mask image of a source image in a block 1802; detecting character targets within the binary mask image, the character targets covering contiguous portions of the binary mask image in a block 1804; forming connected neighbors by grouping one of the character targets and another of the character targets having bounding boxes with a horizontal overlap greater than a horizontal overlap threshold in a block 1806; forming a text unit by grouping the character targets of the connected neighbors, the character targets having a character vertical overlap greater than a character vertical overlap threshold, one of the character targets having a character feature within a feature threshold of another of the character targets, and the text unit a portion of the source image in a block 1808; calculating a text unit baseline angle for rotating the text unit to the horizontal in a block 1810; and detecting an output text of the text unit for display on a device in a block 1812.

It has been discovered that the present invention thus has numerous aspects. The present invention valuably supports and services the historical trend of reducing costs, simplifying systems, and increasing performance. These and other valuable aspects of the present invention consequently further the state of the technology to at least the next level.

Thus, it has been discovered that the image processing system of the present invention furnishes important and heretofore unknown and unavailable solutions, capabilities, and functional aspects for efficiently coding and decoding video content. The resulting processes and configurations are straightforward, cost-effective, uncomplicated, highly versatile and effective, can be surprisingly and unobviously implemented by adapting known technologies, and are thus readily suited for efficiently and economically manufacturing image processing devices fully compatible with conventional manufacturing processes and technologies. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
    generating a binarized image of a source image;
    detecting character targets within the binarized image, the character targets covering contiguous portions of the binarized image;

forming connected neighbors by grouping the character targets having bounding boxes with a horizontal overlap greater than a horizontal overlap threshold;

forming a text unit by grouping the character targets of the connected neighbors, the character targets having a character vertical overlap greater than a character vertical overlap threshold, each of the character targets having a character feature within a feature threshold, and the text unit a portion of the source image;

calculating a text unit baseline angle for rotating the text unit to the horizontal; and detecting an output text of the text unit for display on a device, wherein forming the text unit includes expanding each of the bounding boxes of the character targets horizontally by an extra border distance, the extra border distance calculated by a value $\alpha$ multiplied by the character height plus a border offset.

2. The method as claimed in claim 1 further comprising:

calculating a character aspect ratio by dividing a character height by a character width; and merging the character targets based on the character aspect ratio of one of the character targets within a character aspect ratio threshold of the character aspect ratio of another of the character targets.

3. The method as claimed in claim 1 wherein generating the binarized image includes generating the binarized image of the source image where the source image is unstructured and cluttered, wherein an unstructured image includes textual elements with variations in size, font, style, stroke size, text color, and/or text background color, and a cluttered image includes text completely or partially overlaid on top of graphical elements.

4. The method as claimed in claim 1 further comprising:

determining the most frequent value of the character height for each of the character targets in the text unit;

calculating a text unit baseline through the centers of the character targets having the most frequent value of the character height; and calculating the text unit baseline angle as the angle from the horizontal of the text unit baseline.

5. A method of operation of an image processing system comprising:

generating a binarized image by applying a mask threshold to a source image;

detecting character targets within the binarized image, the character targets covering contiguous portions of the binarized image;

forming connected neighbors by grouping the character targets having bounding boxes with a horizontal overlap greater than a horizontal overlap threshold;

forming a text unit by grouping the character targets of the connected neighbors, the character targets having a character vertical overlap greater than a character vertical overlap threshold, the character targets having a character stroke size within a character stroke size threshold of the character stroke size of another of the character targets, and the text unit a portion of the source image;

calculating a text unit baseline angle for rotating the text unit to the horizontal; and detecting an output text of the text unit for display on a device, wherein forming the text unit includes expanding each of the bounding boxes of the character targets horizontally by an extra border distance, the extra border distance calculated by a value $\alpha$ multiplied by the character height plus a border offset.

6. The method as claimed in claim 5 further comprising:

calculating a character aspect ratio by dividing a character height by a character width; and merging the character targets based on the character aspect ratio of one of the character targets within a character aspect ratio threshold of the character aspect ratio of another of the character targets.

7. The method as claimed in claim 5 wherein generating the binarized image includes generating the binarized image of the source image, the source image unstructured and cluttered, wherein an unstructured image includes textual elements with variations in size, font, style, stroke size, text color, and/or text background color, and a cluttered image includes text completely or partially overlaid on top of graphical elements.

8. The method as claimed in claim 5 further comprising:

determining the most frequent value of the character height for each of the character targets in the text unit;

calculating a text unit baseline through the centers of the character targets having the most frequent value of the character height; and calculating the text unit baseline angle as the angle from the horizontal of the text unit baseline.

9. An image processing system comprising:

a non-transitory memory for storing:
  a source image;
  a binarized image generated from the source image;
  a connected components module for detecting character targets within the binarized image, the character targets covering contiguous portions of the binarized image;
  a text unit module, coupled to the connected components module, for forming connected neighbors by grouping the character targets having bounding boxes with a horizontal overlap greater than a horizontal overlap threshold, and for forming a text unit by grouping the character targets of the connected neighbors, the character targets having a character vertical overlap greater than a character vertical overlap threshold, each of the character targets having a character feature within a feature threshold, and the text unit a portion of the source image;
  an identify baseline module, coupled to the text unit module, for calculating a text unit baseline angle for rotating the text unit to the horizontal; and
  an optical character recognition module, coupled to the text unit module, for detecting an output text of the text unit for display on a device; and a processor for processing the connected components module, the text unit module, the identify baseline module and the optical character recognition module, wherein the text unit module is for expanding each of the bounding boxes of the character targets horizontally by an extra border distance, the extra border distance calculated by a value $\alpha$ multiplied by the character height plus a border offset.

10. The system as claimed in claim 9 wherein the text unit module is for calculating a character aspect ratio by dividing a character height by a character width and merging the character targets based on the character aspect ratio of one of the character targets within a character aspect ratio threshold of the character aspect ratio of another of the character targets.

11. The system as claimed in claim 9 wherein the text detection module is for generating the binarized image of the source image where the source image is unstructured and cluttered, wherein an unstructured image includes textual elements with variations in size, font, style, stroke size, text color, and/or text background color, and a cluttered image includes text completely or partially overlaid on top of graphical elements.

12. The system as claimed in claim 9 further comprising a identify baseline module, coupled to the text unit module, is for determining the most frequent value of the character height for each of the character targets in the text unit, for calculating a text unit baseline through the centers of the character targets having the most frequent value of the character height, and for calculating the text unit baseline angle as the angle from the horizontal of the text unit baseline.

13. The system as claimed in claim 9 wherein:
the text detection module is for generating the binarized image by applying a mask threshold to the source image; and
the text unit module is for forming the text unit by grouping the character targets of the connected neighbors, the character targets having a character vertical overlap greater than a character vertical overlap threshold, the character targets having a character stroke size within a character stroke size threshold of the character stroke size of another of the character targets, and the text unit is a portion of the source image.

14. The system as claimed in claim 13 wherein the text unit module is for calculating a character aspect ratio by dividing a character height by a character width and merging the character targets based on the character aspect ratio of one of the character targets within a character aspect ratio threshold of the character aspect ratio of another of the character targets.

15. The system as claimed in claim 13 wherein the text unit module is for expanding each of the bounding boxes of the character targets horizontally by an extra border distance, the extra border distance calculated by a value $\alpha$ multiplied by the character height plus a border offset.

16. The system as claimed in claim 13 wherein the text detection module is for generating the binarized image of the source image where the source image is unstructured and cluttered, wherein an unstructured image includes textual elements with variations in size, font, style, stroke size, text color, and/or text background color, and a cluttered image includes text completely or partially overlaid on top of graphical elements.

17. The system as claimed in claim 13 further comprising a identify baseline module, coupled to the text unit module, is for determining the most frequent value of the character height for each of the character targets in the text unit, for calculating a text unit baseline through the centers of the character targets having the most frequent value of the character height, and for calculating the text unit baseline angle as the angle from the horizontal of the text unit baseline.

\* \* \* \* \*